(12) United States Patent
Berg et al.

(10) Patent No.: US 11,222,247 B2
(45) Date of Patent: *Jan. 11, 2022

(54) SEMANTIC IMAGE RETRIEVAL

(71) Applicant: Dropbox, Inc., San Francisco, CA (US)

(72) Inventors: Thomas Berg, San Francisco, CA (US); Peter Neil Belhumeur, New York, NY (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/999,616

(22) Filed: Aug. 21, 2020

(65) Prior Publication Data
US 2020/0380320 A1    Dec. 3, 2020

Related U.S. Application Data

(63) Continuation of application No. 16/378,261, filed on Apr. 8, 2019, now Pat. No. 10,769,502.

(51) Int. Cl.
| | | |
|---|---|---|
| *G06K 9/62* | (2006.01) | |
| *G06K 9/72* | (2006.01) | |
| *G06F 16/53* | (2019.01) | |
| *G06F 16/51* | (2019.01) | |
| *G06F 16/58* | (2019.01) | |
| *G06F 16/56* | (2019.01) | |

(52) U.S. Cl.
CPC ............. *G06K 9/726* (2013.01); *G06F 16/51* (2019.01); *G06F 16/53* (2019.01); *G06F 16/56* (2019.01); *G06F 16/5866* (2019.01); *G06K 9/628* (2013.01); *G06K 9/6215* (2013.01)

(58) Field of Classification Search
CPC ...... G06K 9/726; G06K 9/6215; G06K 9/628; G06F 16/53; G06F 16/51; G06F 16/5866; G06F 16/56; G06F 16/5854
USPC ......... 382/224, 187, 305, 160, 118; 707/797
See application file for complete search history.

(56) References Cited

U.S. PATENT DOCUMENTS

| | | | | |
|---|---|---|---|---|
| 8,340,429 B2* | 12/2012 | Kompalli | ........... | G06K 9/00852 382/187 |
| 8,554,800 B2* | 10/2013 | Goldentouch | .......... | G06F 16/81 707/797 |
| 9,596,083 B2* | 3/2017 | Yasuda | ................. | H04L 9/3093 |
| 10,635,949 B2* | 4/2020 | Soldevila | ........... | G06K 9/00852 |
| 2019/0188295 A1* | 6/2019 | Sirotkovic | ........... | G06N 3/0445 |

* cited by examiner

*Primary Examiner* — Charlotte M Baker
(74) *Attorney, Agent, or Firm* — Hickman Becker Bingham Ledesma LLP

(57) ABSTRACT

Computer-implemented techniques for sematic image retrieval. According to one technique, digital images are classified into N number of categories based on their visual content. The classification provides a set of N-dimensional image vectors for the digital images. Each image vector contains up to N number of probability values for up to N number of corresponding categories. An N-dimensional image match vector is generated that projects an input keyword query into the vector space of the set of image vectors by computing the vector similarities between a word vector for the input query and a word vector for each of the N number of categories. Vector similarities between the image match vectors and the set of image vectors can be computed to determine images semantically relevant to the input query.

20 Claims, 5 Drawing Sheets

|  | $D_0$ | $D_1$ | ... | $D_{299}$ |
|---|---|---|---|---|
| $WV_0$ | -0.4 | 0.37 | 0.02 | -0.34 |
| $WV_1$ | -0.15 | -0.02 | -0.23 | -0.23 "dog" |
| $WV_2$ | 0.19 | -0.4 | 0.35 | -0.48 |
| $WV_3$ | -0.08 | 0.31 | 0.56 | ... |

Figure 2

SEMANTIC IMAGE RETRIEVAL

CROSS-REFERENCE TO RELATED APPLICATIONS; BENEFIT CLAIM

This application claims the benefit as a Continuation of application Ser. No. 16/378,261, filed Apr. 8, 2019 the entire contents of which is hereby incorporated by reference as if fully set forth herein, under 35 U.S.C. § 120. The applicant hereby rescinds any disclaimer of claim scope in the parent application or the prosecution history thereof and advise the USPTO that the claims in this application may be broader than any claim in the parent application.

FIELD OF THE INVENTION

The present disclosure relates generally to computer-implemented techniques for retrieving a subset of digital images from a corpus of digital images. More particularly, the present disclosure relates to computer-implemented techniques for retrieving digital images that contain image content that semantically matches one or more input keyword units.

BACKGROUND

Visual databases exist that organize millions of digital images according to meaningful concepts described by synsets. A synset may include a set of one or more keyword units from the same lexical category (e.g., nouns, verbs, etc.) that are roughly synonyms of each other. A keyword unit may consist of a single word or a phrase or other logical grammatical unit.

A visual database may associate multiple digital images with each synset. Each of the images associated with a synset may have content that is representative of the concept described by the synset. For example, the concept of the act of jumping as far as possible from a standing or running start might correspond to a synset with the keyword units "broad jump" and "long jump." This synset, then, may be associated with images in the database containing images of a person broad jumping or long jumping, as in a track and field contest, for example.

Images in a visual database may be associated with tens of thousands of different synsets spanning a range of different concepts. For example, the IMAGENET visual database currently contains over fourteen million digital images associated with over twenty-one thousand different synsets. The synsets of IMAGENET themselves are based on a large lexical database known as WORDNET. More information on IMAGENET is available on the Internet in the imagenet.org domain, the entire contents of which is hereby incorporated by reference. More information on WORDNET is available on the Internet in the wordnet.princeton.edu domain, the entire contents of which is hereby incorporated by reference. Another visual database is the OPEN IMAGES database which is available on the Internet at /openimages/web/index.html in the storage.googleapis.com domain, the entire contents of which is hereby incorporated by reference.

Using computer vision techniques, deep convolutional artificial neural networks can be trained based on visual databases such as IMAGNET to classify input digital images as to image content in different image content classes with a relatively high degree of accuracy. A classification of an image by such a trained network may indicate one or more image content classes that correspond to one or more synsets. For example, the trained network may output a set of softmax values for a given image. The set of softmax values may indicate, for example, that the most probable IMAGENET image content class for the given image is the image content class with identifier "n00440382," which corresponds to a synset containing the keyword phrases "broad jump" and "long jump." In likewise manner, a set of images can each be classified as to image content in one or more different image content classes.

After images are classified as to image content in image content classes, it may be desirable to electronically retrieve certain images. For example, a user of a cloud-based content management service such as, for example, the DROPBOX cloud-based content management service provided by Dropbox, Inc. of San Francisco, Calif., may wish to search or browse through the user's digital photos hosted with the service that are images of the user's pet poodle. To facilitate this, the service may provide a user interface to the user that allows the user to enter and submit the keyword unit "poodle" and then receive results that indicate ones of the user's images that are deemed relevant to that keyword unit.

One possible approach to identify which of the user's digital photos are relevant to a given keyword unit is to index the digital photos in an inverted keyword unit index by the keyword units of the synsets associated with the image content classes to which the digital photos belong, as determined by a trained image classifier. For example, a digital photo of a poodle may be classified in the IMAGENET image content class "n02111277." The synset associated with this image content class contains the keyword units: "dog," "domestic dog," and "*Canis familiaris*." The photo of a poodle may be indexed in an inverted keyword unit index by these keyword units of the associated synset. However, since this synset does not include the keyword unit "poodle," then the digital photo may not be indexed in the inverted keyword unit index by the keyword unit "poodle." As a result, the photo, which is clearly relevant to the user's query, may not be identified as relevant to the query. Overall, the inverted keyword index approach may not identify images that are relevant to an input keyword unit that is roughly synonymous to, but not included in, the set of keyword units of the synsets by which the images are indexed in the inverted keyword unit index.

The present invention address this and other issues.

The approaches described in this section are approaches that could be pursued, but not necessarily approaches that have been previously conceived or pursued. Therefore, unless otherwise indicated, it should not be assumed that any of the approaches described in this section qualify as prior art, or were well-known, routine, or conventional, merely by virtue of their inclusion in this section.

BRIEF DESCRIPTION OF THE DRAWINGS

In the drawings:

FIG. 2 depicts a label matrix supporting semantic image retrieval, according to an implementation of the present invention.

DETAILED DESCRIPTION

Figure 1:
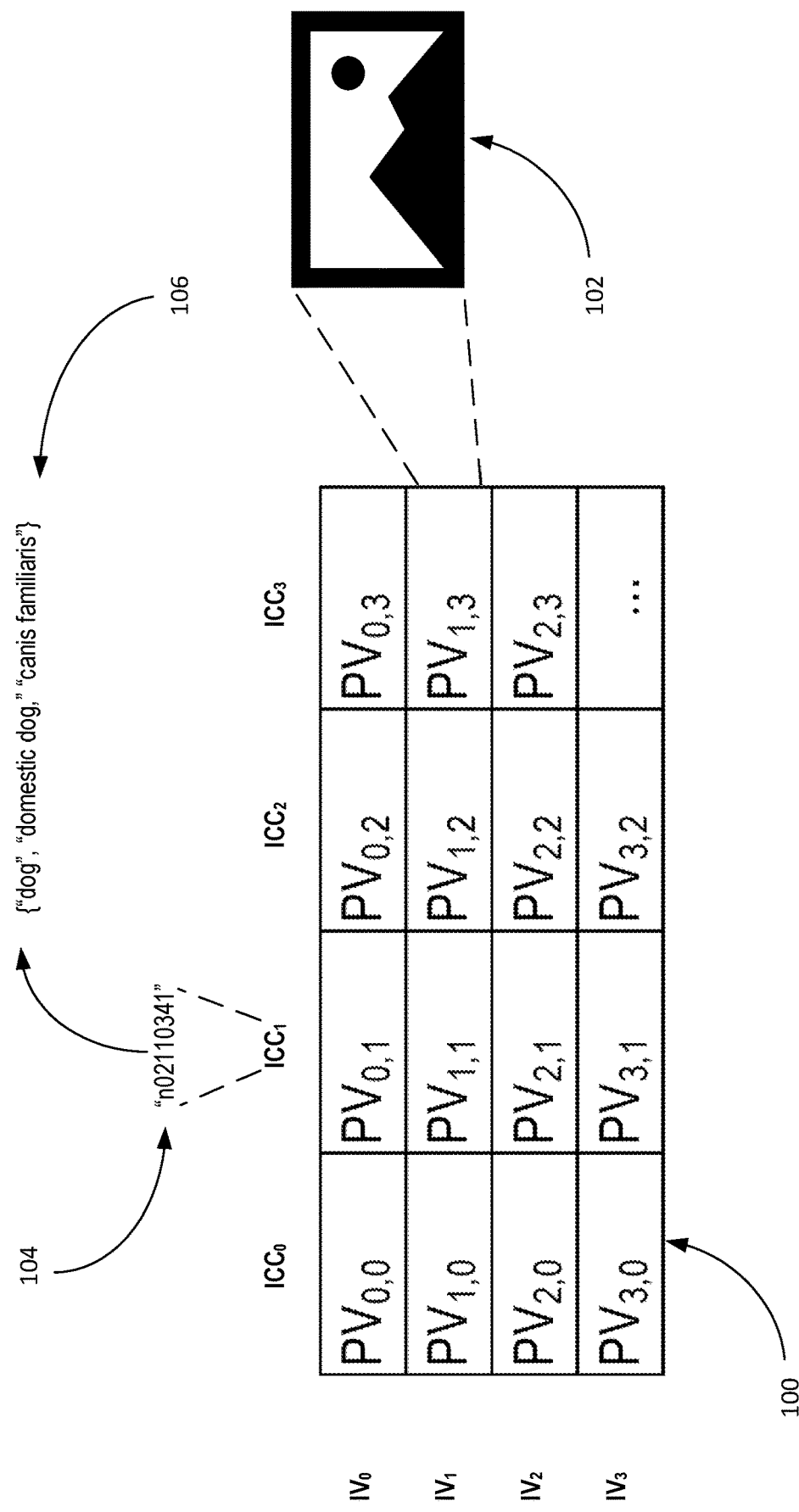
FIG. 1 depicts an image matrix supporting semantic image retrieval, according to an implementation of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Computer-implemented techniques for sematic image retrieval are disclosed. A subset of digital images having image content that is semantically related to a given input keyword unit (sometimes referred to as a "query" herein) may be retrieved from a corpus of digital images even if the subset of images is not indexed in an inverted keyword index by that query. To do this, the corpus of images is first classified into a set of image content classes (sometimes referred to as "categories" herein) using an image classifier. As a result of the classification, the corpus of images is represented by a set of "image" vectors, one image vector per image in the corpus. An image vector for an image contains a set of numerical probability values, up to one probability value for each category in the set of categories. The probability value for a corresponding category reflects a probability, according to the image classifier, that the image belongs to the corresponding category.

Each category of the set of categories may be associated with one or more respective image content class keyword units (also referred to as "labels" herein) that describe the category. For example, a category can be an IMAGENET category and the one or more labels may include the keyword units of the synset associated with the IMAGENET category.

To retrieve the subset of digital images relevant to the query, a word vector representation of the input keyword unit is obtained. The word vector representation is generated according to an embedding function. The embedding function is configured to "project" keyword units in a vector space as word vectors in which distances between the word vectors in the vector space correspond to semantic similarities between the keyword units. Word vector representations are also obtained for the labels associated with the set of categories.

To project the query into the set of image vectors, an "image match" vector is generated having a first set of vector similarity measurements, up to one vector similarity measurement for each category in the set of categories. A vector similarity measurement in the first set of vector similarity measurements measures the vector similarity between the word vector representation of the query and a word vector representation of a category. A vector similarity measurement can be a cosine similarity measure or a dot product measure, for example. For example, the word vector representation of a category can be the word vector representation of the label associated with the category that the word vector representation of the query is most similar to according a vector similarity measurement.

By projecting the query into the set of images vectors, the image match vector is generated having a same number of dimensions as a number of dimensions of the set of image vectors. This facilitates comparing the vector similarity of the image match vector to image vectors in the set of image vectors. Accordingly, a second set of vector similarity measurements are generated by computing a vector similarity between the image match vector and image vectors of the set of image vectors. Like the first set of vector similarity measurements, a vector similarity measurement of the second set of vector similarity measurements can be a cosine similarity measure or a dot product measure, for example. Images may be selected as relevant to the query based on the vector similarity measurements in the second set of vector similarity measurements. For example, the image represented by the image vector of the set of image vectors having the greatest similarity to the image match vector according to the respective vector similarity measurement may be selected as the most relevant image to the query.

As a result of this semantic image retrieval approach, images can be identified as semantically related to a query even if the images are not indexed in an inverted keyword unit index by the query. The semantic image retrieval approach may be used in conjunction with, or instead of, existing approaches for image retrieval. For example, images retrieved according to the semantic image retrieval approach may be combined with images retrieved according an inverted keyword index approach to produce a final set of images that considered relevant to a given query.

Example implementations of the disclosed semantic image retrieval approach will now be described with reference to the figures.

Image Matrix

To compute the second set of vector similarity measurements efficiently, the corpus of digital images and their classifications by the image classifier may be represented in computer storage media as an "image" matrix. FIG. 1 depicts image matrix 100 supporting semantic image retrieval, according to an implementation of the present invention.

Image matrix 100 may be generated based on the corpus of digital images. For example, the corpus of digital images may be a set of digital images that a user or a group of users is hosting with a cloud-based content management service. For example, the set of digital images may be stored in storage media of one or more server computers operated by the cloud-based content management service. As another example, the corpus of digital images may correspond to a set of digital images that are stored at a portable electronic computing device such, as for example, a camera-equipped smart phone. Thus, image matrix 100 may be stored at a server computer such as, for example, a server computer operated by a cloud-based content management service, and/or at a portable electronic computing device such as, for example, at the portable electronic computing device of a user of a cloud-based content management service.

With image matrix 100, each row of matrix 100 is an image vector of the set of image vectors and each column of matrix 100 corresponds to a category of the set of categories. The image vector is for a respective digital image of the corpus of digital images. For example, row of matrix 100 for image vector $IV_1$ is for digital image 102. A digital image represented by an image vector of matrix 100 can be virtually any type of raster digital image (sometimes called a bitmap digital image) including, but not limited to, a digital image having one of the following data formats: .gif (Graphics Interchange Format), .jpg (Joint Photographic Experts Group), .png (Portable Network Graphics), or the like. For example, the corpus of digital images may include digital photos (or compressed versions thereof) captured by camera-equipped portable electronic devices (e.g., smart phones).

While in an implementation rows of image matrix 100 correspond to image vectors and columns of image matrix 100 corresponding to categories, rows of an image matrix may correspond to categories and columns may correspond to image vectors in other implementations.

An image vector of image matrix 100 for a respective digital image comprises a set of probability values for the respective digital image. For example, image vector $IV_1$ comprises probability values $PV_{1,0}$; $PV_{1,1}$; $PV_{1,2}$; and $PV_{1,3}$ for digital image 102. The number of dimensions of the image vectors in image matrix 100 may be equal to the number categories. For purposes of providing a clear example, only four categories are shown in FIG. 1. However, an image matrix may have tens of thousands of dimensions/categories in an implementation, for example.

Each probability value of an image vector may be a real number (e.g., which may which be represented as a floating-point number in a computer) in a range that reflects a probability that the respective digital image belongs to a respective category of the set of categories, as determined by the image classifier. For example, probability value $PV_{1,0}$ reflects a probability that digital image 102 belongs to category $ICC_0$, probability value $PV_{1,1}$ reflects a probability that digital image 102 belongs to category $ICC_1$, probability value $PV_{1,2}$ reflects a probability that digital image 102 belongs to category $ICC_2$, and probability value $PV_{1,3}$ reflects a probability that digital image 102 belongs to category $ICC_3$.

The probability values of an image vector in matrix 100 may be based on the output of the image classifier in classifying the respective digital image in the set of categories. For example, the probability values of image vector $IV_1$ may be based on the output of the image classifier in classifying digital image 102 in the set of categories. The output of the image classifier for a given digital image may be a softmax that represents a probability distribution of the digital image over the set of categories. For example, the probability values of image vector $IV_1$ may be based on a softmax output that represents a probability distribution of digital image 102 over the set of categories. For example, the sum of the probability values of image vector $IV_1$ may be one (1).

The output of the image classifier for a given digital image may be a set of class logits corresponding to the set of categories where each class logit is processed through an independent sigmoid function to produce the probability values for the image vector. For example, the probability value $PV_{1,0}$ may result from a class logit for category $ICC_0$ produced by the image classifier and processed through a sigmoid function to produce the probability value $PV_{1,0}$.

It is also possible to use multiple image classifiers. For example, each digital image in the corpus of digital images may be input to multiple different image classifiers. In this case, the set of categories may include different subsets of image content classes in which different image classifiers are able to classify digital images. For example, a first image classifier may be able to classify digital images in categories $ICC_0$ and $ICC_1$ and a second image classifier may be able to classify digital images in categories $ICC_2$ and $ICC_3$. For example, in an implementation, there are 26,076 total categories in the set of categories ranging a wide variety of different types of image content where a first image classifier is used to classify each digital image in the corpus of digital images in 21,076 IMAGENET categories and a second image classifier is used to classify each digital image in the corpus of digital images in 5,000 OPEN IMAGES categories. In this case, each image vector of matrix 100 has 26,076 dimensions including 21,076 probability values for the 21,076 IMAGENET categories and 5,000 probability values for the 5,000 OPEN IMAGES categories.

It should be noted that one or more probability values of an image vector in matrix 100 can be zero. As such, matrix 100 may contain a number of zero-valued probability values. In this case, matrix 100 may be stored in a computer storage media using a sparse matrix representation (e.g., an array representation or a linked list representation) where zero-valued probability values are not individually represented to conserve storage media space.

In an implementation, to reduce the storage media size of matrix 100 and improve the computational performance of comparing an image match vector to the set of image vectors at image retrieval time, each image vector stored in matrix 100 contains only a top X number of probability values as elements and the remainder of the elements are zero. For example, X may be one-hundred, as just one possibility, and X may vary according to requirements of the particular implementation at hand. In addition to, as an alternative to, retaining only a top X number of non-zero elements in a vector, non-zero elements that close to zero (e.g., within a threshold amount) can set to zero. Thus, each image vector in matrix 100 may contain non-zero probability values as elements only for those categories that are most probable for the corresponding digital image according to the image classifier. This effectively rounds down to zero the potentially many probability values in an image vector having small numerical values reflecting the relatively slight probability that the corresponding digital image belongs to the corresponding categories.

While the above techniques are described as reducing the computer storage media size of, and improving computational performance with respect to, the image matrix by using a sparse representation thereof, the above techniques can be applied to other matrices and vectors described herein to reduce computer storage media size of and improve computational efficiency with respect to those matrices and vectors. For example, a sparse representation of the label matrix or the image match vector may be used in an implementation. Thus, reference herein to a matrix or a vector is intended to encompass sparse representations thereof where the sparse representation is either truncated to a top-X number of non-zero elements, thresh-holded such that non-zero elements within a threshold are considered to be or set to zero, or a combination of a truncated and a thresh-holded representation. The parameter X and the threshold may be selected according to the requirements of the particular implementation at hand including based on a tradeoff between (a) reduced computer storage media size and increased computational efficiency with a lower value for X and a higher value for the threshold and (b) increased accuracy of semantic image retrieval operations with a higher value for X and a lower value for the threshold, as one skilled in the would understand in light of this disclosure.

A variety of different image classifiers may be used and no particular type of image classifier is required. In general, the image classifier uses computer vision techniques to recognize visual concepts in digital images based on raw representations of the images such as, for example, three-dimensional arrays of brightness values while accounting for possible visual variations in the images such as, for example, viewpoint, scale, deformation, occlusion, illumination conditions, background clutter, and intra-class variation (e.g., many different types of dogs may fall into the dog category.)

In an implementation, the image classifier, or image classifiers if multiple image classifiers are used, is based on a deep artificial neural network computing architecture. An artificial neural network is a computational model for machine learning algorithms that is inspired by biological neural networks of animal brains. An artificial neural network may be based on a collection of connected units or nodes called artificial neurons, which loosely model the neurons in a biological brain. Each connection, like the synapses in a biological brain, can transmit a signal from one artificial neuron to another. An artificial neuron that receives a signal can process it and then signal additional artificial neurons connected to it. A deep artificial neural network is a type of artificial neural network with multiple layers between the input and output layers.

In an implementation, the image classifier, or image classifiers if multiple image classifiers are used, is based on a deep convolutional artificial neural network computing architecture. A deep convolutional artificial neural network computing architecture is a type of deep artificial neural network computing architecture that is inspired by biological processes in that connectivity pattern between the artificial neurons resembles the organization of the animal visual cortex. As such, deep convolutional artificial neural network architectures have proven to be especially well suited to analyzing visual imagery such as that of digital images. Various different approaches may be used to train a deep convolutional artificial neural network to classify the corpus of digital images based on image content. For example, an approach may be based on training a large, deep convolutional artificial neural network to classify images in categories as described in the paper by A. Krizhevsky, I Sutskever, G E Hinton, "ImageNet Classification with Deep Convolutional Neural Networks," Advances in neural information processing systems, pp. 1096-1105 (2012), the entire contents of which is hereby incorporated by reference.

While a deep convolutional artificial neural network architecture may be used by the image classifier to classify the corpus of digital images in the set of categories according to visual image content, a non-artificial neural network-based approach may be used. For example, an approach based on training a multiclass support vector machine may be used instead of a deep convolutional artificial neural network-based approach.

Further, while an implementation uses a trained machine image classifier (e.g., a trained multiclass support vector machine or a trained deep convolutional artificial neural network) to classify the corpus of digital images in the set of categories, a manual approach may be used instead. For example, a probability value in matrix 100 may be a numerical Boolean value (e.g., zero or one) assigned based on human user input that indicates whether the respective digital image does or does not belong to the respective category according to human user's judgement. For example, probability value $PV_{1,1}$ may equal one indicating that digital image 102 contains an image of a dog. Overall, the classification of digital images in the corpus of digital images into the set of categories can based on machine classification, human classification, or a combination of machine and human classification. For example, a machine may make an initial classification of a digital image into one or more categories of the set of categories which is then confirmed or corrected by a human to make a final classification of the digital image.

The set of categories represented in matrix 100 correspond to different image content classes. Each image content class may be associated with a class identifier which identifies the image content class in a taxonomy of image content classes. For example, as shown in FIG. 1, category $ICC_1$ is associated with class identifier "n02110341" which identifies an IMAGENET category. By way of the associated class identifier, a category may further be associated with a synset that contains labels that describe the category.

For example, as shown in FIG. 1, category $ICC_1$ is associated with synset 106 consisting of the labels "dog," "domestic dog," and "*Canis familiaris*." Thus, a category of the set of categories can be associated with multiple labels that describe the category depending on whether the synset associated with the category contains more than one label. As such, the set of labels units for all categories may be larger than the set of categories.

In an implementation, there are approximately 25,000 categories and approximately 50,000 total labels over those categories in the synsets associated with the set of categories. However, it is also possible for some or all categories to each be associated with only one label.

Label Matrix

As mentioned, the set of labels may be mapped to a set of respective word vectors. The set of respective word vectors may be pre-trained. For example, the set of respective word vectors may be pre-trained based on Common Crawl and GloVe. Common Crawl is a public repository of web crawl data (e.g., blogs, news, and comments) available on the internet in the commoncrawl.org domain, the entire contents of which is hereby incorporated by reference. GloVe is an unsupervised learning algorithm for obtaining vector representations for words. Training is performed on aggregated global word-word co-occurrence statistics from a corpus such as, for example, a corpus available from Common Crawl, and the resulting word vector representations exhibit linear substructures of a word vector space. More information on GloVe can be found in the paper by Jeffrey Pennington, Richard Socher, and Cristopher D. Manning, 2014, "GloVe: Global Vectors for Word Representation," the entire contents of which is hereby incorporated by reference.

While in an implementation word vectors are obtained for keyword units (e.g., labels, queries, etc.) from context independent pre-trained word embeddings, contextualized word vectors are obtained based on pre-trained language models in another implementation. For example, a pre-trained Bidirectional Encoder Representations from Transformers (BERT) model may be used in an implementation to create the contextualized word vectors. More information on the BERT model is available in the paper by Jacob Devlin, Ming-Wei Chang, Kenton Lee, Kristina Toutanova, "BERT: Pre-training of Deep Bidirectional Transformers for Language Understanding," arXiv:1810.04805 (2018), the entire contents of which is hereby incorporated by reference.

In an implementation, each word vector of the set of respective word vectors for the set of labels is a 300-dimensional vector. For example, the set of respective word vectors may be obtained by using each label (or words of the label) as a key into a data dictionary, associative array, or the like, that maps labels (or keyword units thereof) to unique word vectors.

In an implementation, the en_vectors_web_lg data dictionary is issued which is currently available on the internet at/models/en#en_vectors_web_lg in the spacy.io domain, the entire contents of which is hereby incorporated by reference. Other English language models may be used, as well as non-English language models, according to the requirements of the particular implementation at hand. For example, if the set of labels is in the German language, then a German-language model may be used.

While in an implementation the set of respective word vectors are pre-trained based on a Common Crawl corpus using the GloVe word embedding function, the set of respective word vectors are pre-trained based on a different training corpus and/or a different word embedding function in another implementation. For example, the set of respective word vectors may be pre-trained based on a set of Wikipedia articles using the word2vec word embedding function or the fastText word embedding function. More information on the word2vec word embedding function is available on the paper by Thomas Mikolov, Ilya Sutskever, Kai Chen, Greg Corrado, and Jeffrey dean, "Distributed Representations of Words and Phrases and their Compositionality," NIPS, Curran Associates, Inc., (2013), the entire contents of which is hereby incorporated by reference. More information on the fastText embedding function is described in the paper by Piotr Bojanowski, Edouard Grave, Armand Joulin, and Tomas Mikolov, "Enriching Word Vectors with Subword Information," Transactions of the Association for Computational Linguistics (2017), the enter content of which is hereby incorporated by reference.

It should be noted that a single pre-trained word vector may not be available for a given label where the label includes multiple words. For example, a pre-trained word vector for an idiomatic phrase such as "Boston Globe" may not be available. However, separate pre-trained word vectors may be available for "Boston" and "Globe." In this case, where there is no single pre-trained word vector available for a multi-word label but there are separate word vectors available for each of the words that make up the label, then the separate word vectors may be combined (e.g., averaged) to produce a single word vector that represents the label. For example, the pre-trained word vector for "Boston" and the pre-trained word vector for "Globe" may be averaged to produce a single word vector that represents "Boston Globe."

In the case a pre-trained word vector is not available for a particular label such as a very rare word, then a zero vector may be used to represent the particular label.

Also as mentioned, at image retrieval time, the query may be mapped to a respective word vector in the same manner that the set of labels are mapped to a set of respective word vectors. Also as mentioned, at image retrieval time, the word vector representation of the query is compared for vector similarity against each word vector of the set of respective word vectors for the set of labels. To make this vector similarity comparison efficient, the set of respective word vector representations may be stored in computer storage media as a "label" matrix.

FIG. 2 depicts label matrix 200 supporting semantic image retrieval, according to an implementation of the present invention. Rows of label matrix 200 are word vectors. Each word vector represents a respective label. For example, word vector $WV_1$ represents label 202 which is the word "dog." Columns of label matrix 200 are dimensions of the word vectors. In this example, there are 300-dimensional word vectors stored in label matrix 200. However, lower or higher dimensional word vectors may be used according to the requirements of the particular implementation at hand.

While in an implementation rows of a label matrix correspond to word vectors and columns of the label matrix corresponding to dimensions, rows of a label matrix correspond word vector dimensions and columns correspond to the word vectors in other implementations.

In an implementation, non-zero word vectors in label matrix 200 are normalized to the unit L2 norm to speed up vector similarity computations at image retrieval time. Duplicate word vectors may be omitted from label matrix 200. For example, label matrix 200 need store only one zero vector for all labels represented by a zero word vector (e.g., all elements of the vector are zeroed). In some cases, a non-zero word vector may be a duplicate of another non-zero word vector such as, for example, where multiple labels contain the same set of words but in a different order, or where a rare word is approximated using the word vector for a close synonym.

Offline Process for Generating the Label Matrix

Each digital image of the corpus of digital images can be assigned by the image classifier to one or more of M number of different categories. For example, the set of M number of categories may correspond to categories of visual items or concepts that might appear in an image such as, for example, dog, cat, chair, cat, ice cream, sunset, outside, indoors, etc. In an implementation, M is approximately 25,000.

Each of the M categories may be associated with one or more labels. Thus, there can be a total N number of labels for the M number of categories where N is greater than M. In an implementation, N is approximately 45,000.

Figure 3:
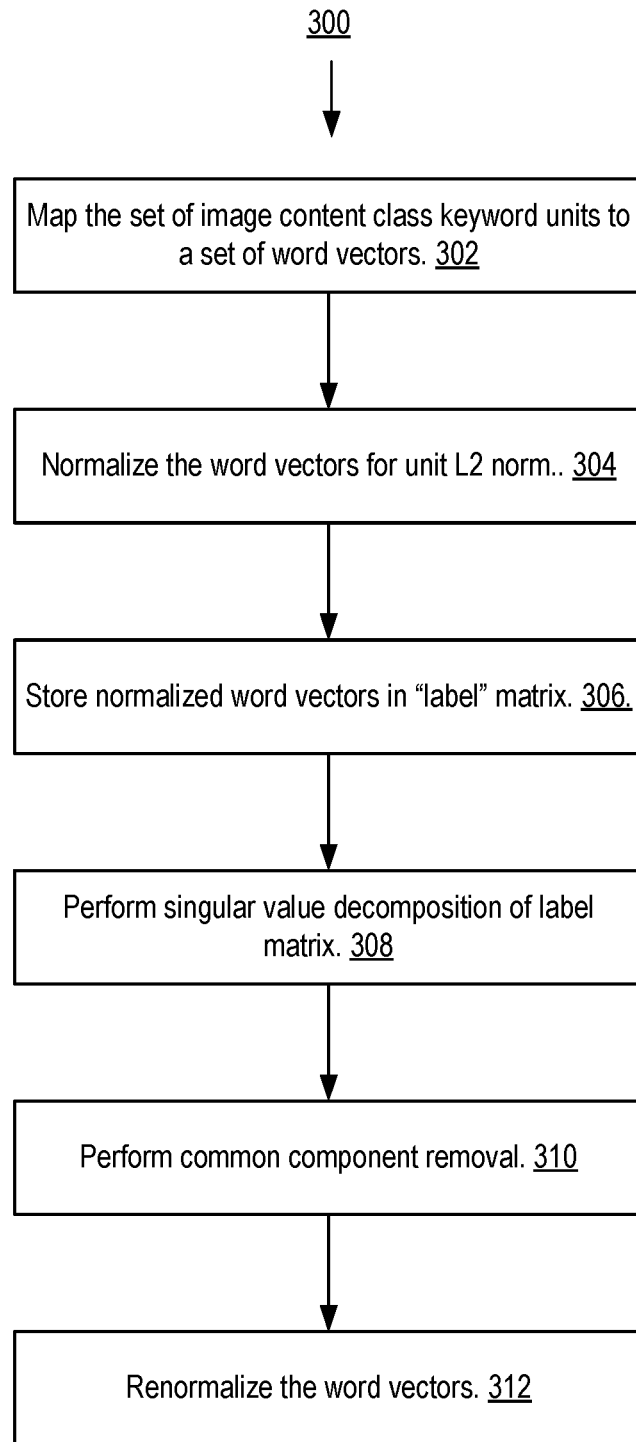
FIG. 3 depicts an offline process for generating the label matrix, according to an implementation of the present invention.

With this mind, turning now to FIG. 3, it is an offline process 300 for generating a label matrix (e.g., label matrix 200), according to an implementation of the present invention.

Initially, each label of the set of the N number of labels is mapped 302 using a word embedding to a 300-dimensional vector space. The mapping may be given by an embedding function nlp( ). The embedding function nlp( ) may be one of the GloVe, the fastText, or the word2vec embedding functions discussed above, for example.

In other words, for each label $label_i$ in the set of N number of labels, the label $label_i$ may be mapped to a word vector $l_i$ as in the following equation:

$$l_i = nlp(label_i) \in \mathbb{R}^{300}$$

Here, word vector $l_i$ represents the word vector provided by the embedding function nlp( ) for the $i^{th}$ label of the set of labels. It should be noted that the word vector $l_i$ may be pre-trained by the embedding function nlp( ) such that obtaining the word vector $l_i$ for the label $label_i$ simply involves a look up into a mapping that maps the set of labels (or keyword units thereof) to a set of pre-trained word vectors, as opposed to having to invoke the embedding function nlp( ) to obtain the word vector $l_i$ at the time of the mapping the label $label_i$ to the word vector $l_i$.

For computational efficiency at image retrieval time, each word vector of the set of word vectors obtained at operation 302 are normalized 304 for the unit L2 norm. In other words, for each word vector $l_i$ in the set of word vectors obtained 302 for the set of labels, the word vector $l_i$ is normalized as in the following equation:

$$l'_i = \frac{l_i}{\|l_i\|_2}$$

Here, word vector $l'_i$ represents the $i^{th}$ word vector of the set of word vectors obtained at operation 302 as normalized for the unit L2 norm as in the equation above.

At operation 306, the normalized set of word vectors as normalized at operation 304 are stored in a label matrix (e.g., label matrix 200). In particular:

$$L'=[l'_1 l'_2 \ldots l'_N]_{300 \times N}$$

Here, label matrix L' represents the label matrix where each column contains a unit L2 normalized word vector as normalized at operation 304.

At operation 308, singular value decomposition is performed on the label matrix L' stored at operation 306. In particular:

$$L'=UDV$$

where:

$$U=[u_1 u_2 \ldots u_{300}]_{300 \times 300}$$

$$D=\text{diag}[s_1 s \ldots s_{300}]_{300 \times N'}$$

$$V=[v_1 v_2 \ldots v_N]_{N \times N}$$

At operation 310, a rank 1 matrix is constructed from the outer product with itself of the left singular vector corresponding to the largest singular value $u_1 u_1^T \in \mathbb{R}^{300 \times 300}$ of the label matrix L'. The rank 1 matrix is used to remove the left singular vector formed from all vectors from each of the word vectors in the label matrix L'. Operation 310 is motivated by the common component removal described in the paper by Sanjeev Arora, Yingyu Liang, and Tengyu Ma, "A simple but tough-to-beat baseline for sentence embeddings," ICLR 2017, the entire contents of which is hereby incorporated by reference. In other words, operation 310 may be performed in accordance with the following equation:

$$L''=L'-u_1 u_1^T L'=[l''_1 l''_2 \ldots l''_N]_{300 \times N}$$

Here, label matrix L" represents the corrected label matrix having word vectors $[l''_1\ l''_2\ \ldots\ l''_N]_{300 \times N}$ as corrected for common component removal.

After the word vectors are corrected for common component removal as in operation 310 above, each of the corrected word vectors are again normalized 312 for the unit L2 norm as in the following equation:

$$\hat{l}_i = \frac{l''}{\|l''_i\|_2}$$

Here, $\hat{l}_i$ represents the $i^{th}$ corrected (operation 310) word vector normalized for the unit L2 norm as in the equation above.

As a result of process 300, a final label matrix $\hat{L}$ is generated as represented by the following equation:

$$\hat{L}=[\hat{l}_1 \hat{l}_2 \ldots \hat{l}_N]_{300 \times N}$$

Process 300 is may be an offline process. That is, process 300 may be performed may be performed before or outside the context of retrieving images for a given query (e.g., as a preprocessing step.) An online process for semantic image retrieval will now be described with respect to FIG. 4 and with reference to offline process 300 of FIG. 3.

Online Process for Semantic Image Retrieval

Figure 4:
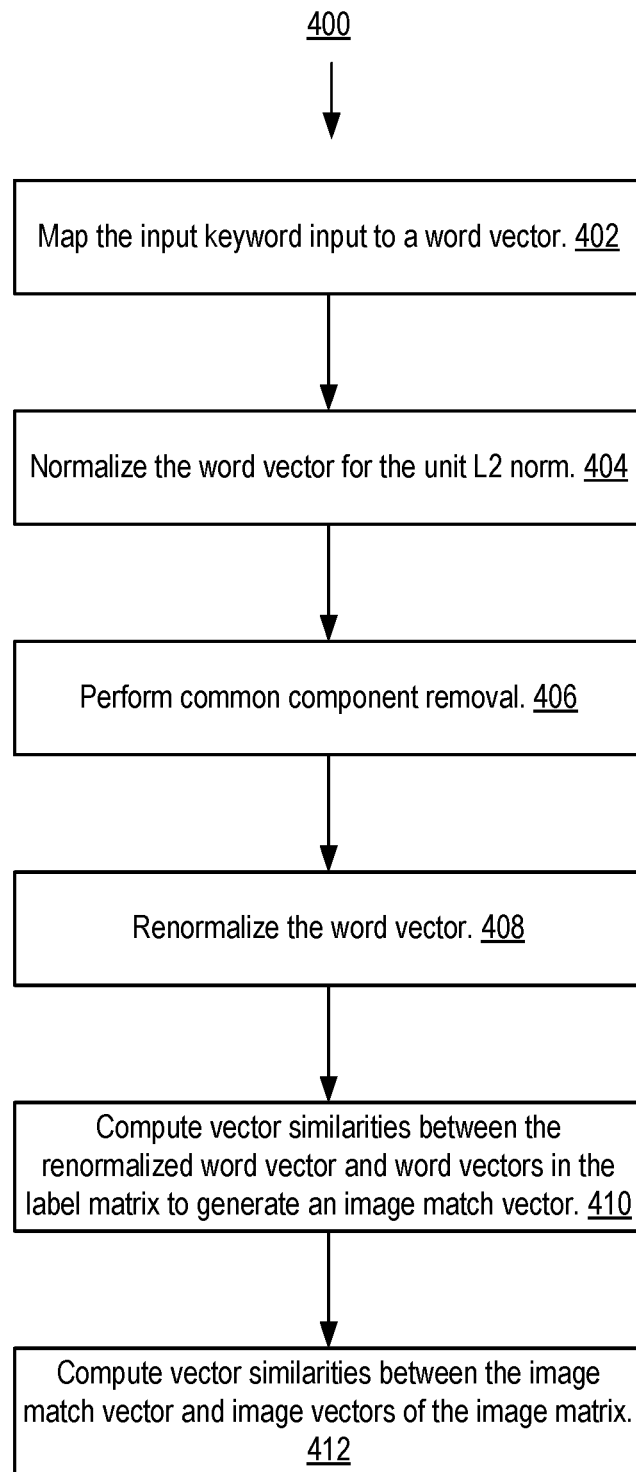
FIG. 4 depicts an online process for semantic image retrieval, according to an implementation of the present invention.

Turning now to FIG. 4, it depicts online process 400 for semantic image retrieval, according to an implementation of the present invention. Process 400 may be performed "online" in the context of obtaining or receiving a query and identifying one or more digital images that are relevant to the query.

At operation 402, the query is mapped to a word vector using the same word embedding used to convert the set of labels to a set of word vectors as in operation 302 of process 300 discussed above. The mapping may be given by the same embedding function nlp( ) The embedding function nlp( ) may be one of the GloVe, the fastText, or the word2vec embedding functions discussed above, for example. In other words, the query query may be mapped to an input word vector q as in the following equation:

$$q=nlp(\text{query}) \in \mathbb{R}^{300}$$

It should be noted that the word vector q for the query query may be precomputed by the embedding function nlp( ) prior to performance of process 400. As such, determining the input word vector q for the query query may be a relatively computationally efficient operation such as a lookup in a data dictionary, associative array, or other lookup table.

At operation 404, the input word vector q may be normalized for the unit L2 norm as in the following equation:

$$q' = \frac{q}{\|q\|_2}$$

Here, input word vector q' represents the unit L2 normalized version of input word vector q.

At operation 406, removal of the component of the normalized input word vector q' aligned with the left singular vector of the largest singular value of the corrected label matrix above L' is performed. This is analogous to operation 310 described above with respect to process 300. This produces corrected input word vector q". In an implementation, operation 406 is performed in accordance with the following equation:

$$q''=q'-u_1 u_1^T q'$$

At operation 408, the corrected input word vector q" is normalized for the unit L2 norm as in the following equation:

$$q'' = \frac{q'}{\|q'\|_2}$$

At operation 410, the normalized input word vector q" is compared for similarity against each normalized word vector $[\hat{l}_1\ \hat{l}_2\ \ldots\ \hat{l}_N]_{300 \times N}$ of the final label matrix L to determine a vector similarity measurement for each normalized word vector $[\hat{l}_1\ \hat{l}_2\ \ldots\ \hat{l}_N]_{300 \times N}$ of the final label matrix $\hat{L}$. The vector similarity measurement may be a cosine similarity measurement or a dot product measurement. In an implementation, the cosine similarity measurement of input word vector q" and a word vector $\hat{l}_i$ of the final label matrix $\hat{L}$ is made according to the following equation:

$$\frac{q'' \cdot \hat{l}_i}{\|q''\| \|\hat{l}_i\|}$$

Also at operation 410, an image match vector may be generated from the set of vector similarity measurements.

The image match vector may have a number of dimensions equal to the number of categories. That is, the dimensions of the image match vector and the set of image vectors in the image matrix may match. Each element of the image match vector may correspond to a category by the position of the element in the image match vector where the same position of an element in an image vector corresponds to the same category. As such, a vector similarity measurement can be used to measure how related the query is, based on the query's similarity to the set of labels as represented by the image match vector, to a digital image, based on the categories to which the digital image probabilistically belongs as represented by the image vector for the digital image. For example, a cosine similarity measurement or a dot product measurement between the image match vector and an image vector numerically quantifies how semantically related the image corresponding to the image vector is to the query.

In an implementation, the image match vector is row-oriented:

$$[S_1 S_2 \ldots S_N]_{1 \times N}$$

It also possible for the image match vector to be column-oriented:

$$[S_1 S_2 \ldots S_N]_{N \times 1}$$

In either case, each element of the image match vector corresponds by position to an element of the set of image vectors of the image matrix. Here, N represents the number of categories. For example, in image matrix 100, the set of image vectors have four element positions. The first position corresponds to category $ICC_0$, the second position corresponds to category $ICC_1$, the third position corresponds to category $ICC_2$, and the fourth position corresponds to category $ICC_3$. In this case, in image match vector $[S_1 \, S_2 \, S_3 \, S_4]_{1 \times 4}$, the first position with vector similarity measure $S_1$ corresponds to category $ICC_0$, the second position with vector similarity measure $S_2$ corresponds to category $ICC_1$, the third position with vector similarity measure $S_3$ corresponds to category $ICC_3$, and the fourth position with vector similarity measure $S_4$ corresponds to category $ICC_4$.

The vector similarity measurement of the element of the image match vector reflects the semantic similarity between the query for which the image match vector is generated and the labels of the category that corresponds to the element. For example, in image match vector $[S_1 \, S_2 \, S_3 \, S_4]_{1 \times 4}$ with respect to image matrix 100 of FIG. 1, vector similarity measurement $S_2$ reflects the semantic similarity between a query (e.g., "poodle") and labels 106 of category 104. If the query is "poodle," for example, then vector similarity measurement $S_2$ may reflect a relatively high semantic similarity between the query and labels 106 because a poodle is a type of domestic dog and thus the word vector for "poodle" is likely to have a vector similarity to the word vectors for labels 106.

When there is only one label for a category, then the vector similarity measurement in the image match vector for the category can be the vector similarity between the word vector for the query and the word vector for the label. However, there can be multiple labels for a category. For example, category 104 in FIG. 1 has multiple labels 106. In this case, the vector similarity measurement in the image match vector for the multi-label category can be the greatest vector similarity between the word vector for the query and all of the word vectors for all of the labels of the category. Alternatively, the vector similarity measurement in the image match vector for the multi-label category can be the average of all of the word vectors for all of the labels of the category.

In an implementation, to increase the numerical saliency of relatively high vector similarity measurements of the image match vector corresponding to strongly matched categories, the image match vector may be "stretched." In particular, vector similarity measurements of the image match vector that are negative are set to zero in the image match vector and positive vector similarity measurements of the image match vector are set as a predetermined exponential of the vector similarity measurement in the image match vector. This has the effect of zeroing out negative vector similarity measurements in the image match vector and stretching positive vector similarity measurements in the image match vector resulting in greater separation between vector similarity measurements for more strongly matched categories in the image match vector. For example, each positive vector similarity measurement $S_i$ of the image match vector may be adjusted to equal $S_i^k$, where k is an exponent. In an implementation, k is 3.3 but may be adjusted up or down according to the requirements of the particular implementation at hand based on how the value of k affects the ranking of images according to ranking scores computed for the images based on computing vector similarity measurements between the image match vector as stretched by the exponent k and the set of image vectors. In an implementation, the exponent k is learned and adjusted according to machine learning techniques based on click-through logs.

At operation 412, ranking scores for images relevant to the query may be computed based on computing the vector similarities between the image match vector and image vectors of the image matrix. For example, the cosine similarity may be computed for the image match vector and each image vector of the image matrix. Alternatively, the dot product between the image match vector each image vector may be computed. The images corresponding to the image vectors that have the greatest vector similarity to the image match vector may be selected as the images that are most relevant to the query. The images may be ranked as to relevance to the query in order of the corresponding vector similarities.

It is possible for an image retrieval request to involve multiple keyword units. For example, instead of an image retrieval request specifying a single keyword unit such as "poodle," an image retrieval request may specify multiple keywords units as in "poodle beach." In this case, where an image retrieval request specifies multiple keyword units, an intermediate image match vector may be generated for each individual keyword unit as described above. Then a vector similarity measurement is obtained for each of the image match vectors. The vector similarity measurement of an image match vector is obtained by computing the cosine similarity between, or the dot product of, the image match vector and a given image vector, as in the single keyword unit query case. This results in a set of vector similarity measurements, one for each image match vector, with respect to the given image vector. A ranking score may be computed for the given image vector (and thus the associated image) by computing the scalar product of the multiple vector similarity measurements computed for the multiple keyword units. This may be repeated for each other image vector under consideration to compute ranking scores for those image vectors and associated images in the case where the query has multiple keyword units.

Image-Label Matrix Optimization

In an implementation, an image-label matrix is pre-computed before image retrieval and used at image retrieval to identify images relevant to an input keyword unit. This can provide the benefit of improving the computational efficiency at image retrieval time with the potential drawback that the image-label matrix is less amenable to a sparse representation that significantly reduces the computer storage media size of the label-image matrix.

The image-label matrix may be generated by multiplying the A by N image matrix by an N by B category matrix. Here, A represents the number of image vectors in the image matrix, N represents the number of image content categories (e.g., 45,000), and B represents the number dimensions of the word vector representations (e.g., 300). The N by B category matrix may be generated from the label matrix or the word vector representations of the set of labels. In particular, for each of the N number of image content categories, a word vector representation may be generated based on the word vector representations of the labels for the category and included in the category matrix. For example, if the category has more than one label, the word vector representation for a category may be generated by averaging the word vector representations of the labels for the category. If the category has only a single label, then the word vector representation of that label may be used to represent the category in the category matrix. As a result of multiplying the A by N image matrix by the N by B category matrix, an A by B image-category matrix is generated which occupies less computer storage media than the A by N image matrix where the number of image content categories is greater than the number of dimensions of the word vector representations, which is typical.

At image retrieval time, the typically smaller image-category matrix can be accessed, and the typically larger image matrix need not be accessed. In particular, given a B by 1 word vector representation of an input keyword unit, a ranking score can be computed for each of the A number of images by multiplying the A by B image-category matrix by the B by 1 word vector representations of the input keyword unit to generate an A by 1 ranking score vector where each element of the ranking score vector contains as a numerical ranking score for a corresponding image as a result of the multiplication. Images may be ranked in order of relevant to the input keyword unit based on the ranking scores of the ranking score vector.

Inverted Index Implementation

In an implementation, inverted index retrieval is supported to improve computational efficiency at image retrieval time. In this implementation, the image vectors that could be stored in an image matrix are stored in posting lists of an inverted index keyed by image content categories. For an image match vector generated for an input keyword, a sparse representation of the image match vector is used. The sparse image match vector has non-zero elements corresponding to a subset of all image content categories. Identifiers of the image content categories corresponding to the non-zero elements of the image match vector may be used as keys into the inverted index to efficiently retrieve all image vectors associated with those image content categories by their respective non-zero elements. The image match vector (either the non-sparse or sparse version) can be compared for vector similarity against just those retrieved image vectors to compute ranking scores for the images corresponding to the retrieved image vectors. The number of comparisons for vector similarity using the sparse image match vector and inverted index may be substantially fewer than if the image match vector were compared for vector similarity against all image vectors in the image matrix, thereby improving computational efficiency at image retrieval time.

Note that in such an inverted index implementation, the image matrix need not be stored in and accessible in computer storage media. However, it is also possible in an implementation to use both the inverted index and the image matrix. For example, the inverted index may be used to quickly identify and return relevant images, while at the same time the image matrix is accessed, asynchronous to the inverted index access, to perform a more comprehensive identification of relevant images (e.g., ranking all images in the image matrix.)

Internationalization

In an implementation, non-English semantic image retrieval is supported with reduced additional computer storage media overhead. In particular, an additional label matrix is generated for a non-English target language (e.g., Chinese, Japanese, German, etc.) where the set of labels of the English label matrix is translated to a set of target language labels and word vectors for the set of target language labels are obtained based on an embedding function for the target language. The target label matrix includes the word vectors for the set of target language labels. An input keyword unit or units in the target language may then be processed like an English language input keyword unit or units except using the target language label matrix instead of the English language label matrix. Also, since the input keyword unit or units are in the target language, they are converted to word vector representations according to the embedding function for the target language. Note that an additional image matrix need not be stored to support the target language because the image content categories for the images represented by the image matrix are the same for both languages. As with the English language, the word vectors for the set of target language labels may be obtained from a set of pre-trained word vectors generated by the embedding function for the target language. The set of English language labels may be translated to the set of target language labels on a label-by-label basis using a natural language machine translator configured to translate text between different language pairs.

Example Applications

In an implementation, the semantic image retrieval techniques are used to identify images to return as search results to a user's keyword unit query. The keyword unit query may have one or more keyword units such as, for example, the queries "poodle," "poodle beach," or "poodle on beach." For example, an online content management system may present a graphical user interface to a user at the user's personal computing device such as, for example, in a web browser application or a mobile application. The graphical user interface may prompt the user to enter and submit a keyword unit query to the online content management system. Upon receiving the keyword unit query, the techniques disclosed herein are used to identify one or more digital images hosted with the online content management system that semantically match the keyword unit query. Links to or thumbnails of the semantically matching images may be returned to user's personal computing device for presentation in a graphical user interface there. The semantically matching images may be presented in the graphical user interface in ranking order from most relevant to less relevant.

In another implementation, the semantic image retrieval techniques are used within an online content management system to suggest images to include in a word processing document. In particular, after the user has entered text in the word processing document using a document editing application, an image is suggested to the user to include in the document based on the entered text. For example, the user may have just entered the text of the sentence: "I love taking a walk on the beach with my pet poodle." The document editing application may parse the sentence for keyword units such as, for example, the noun keyword units "beach" and "poodle." The document editing application may then send an asynchronous image retrieval request to the online content management system with the keyword unit query "beach poodle." The request may be sent asynchronously while the user continues to enter text in the word processing document. The online content management system may use techniques disclosed herein to identify one or more digital images hosted with the online content management system that semantically match the keyword unit query "beach poodle." Links to or thumbnails of the semantically matching images may be returned to user's personal computing device for presentation by the document editing application. The user may then select one of the links or thumbnails to include the selected digital image in the word processing document being edited. In this way, the user is automatically suggested a digital image to include in the word processing document that semantically matches text the user has authored into the document.

Computing System Implementation

An implementation of the present invention may encompass performance of a method by a computing system having one or more processors and storage media. The one or more processors and the storage media may be provided by one or more computer systems, and not necessarily the same computer system(s). The storage media of the computing system may store one or more computer programs. The one or more programs may include instructions configured to perform the method. The instructions may also be executed by the one or more processors to perform the method.

An implementation of the present invention may encompass one or more non-transitory computer-readable media. The one or more non-transitory computer-readable media may store the one or more computer programs that include the instructions configured to perform the method.

An implementation of the present invention may encompass the computing system having the one or more processors and the storage media storing the one or more computer programs that include the instructions configured to perform the method.

An implementation of the present invention may encompass one or more virtual machines that operate on top of one or more computer systems and emulate virtual hardware. A virtual machine can be a Type-1 or Type-2 hypervisor, for example. Operating system virtualization using containers is also possible instead of, or in conjunction with, hardware virtualization with hypervisors.

For an implementation that encompasses multiple computer systems, the computer systems may be arranged in a distributed, parallel, clustered or other suitable multi-node computing configuration in which computer systems are continuously, periodically, or intermittently interconnected by one or more data communications networks (e.g., one or more internet protocol (IP) networks.) Further, it need not be the case that the set of computer systems that execute the instructions be the same set of computer systems that provide the storage media storing the one or more computer programs, and the sets may only partially overlap or may be mutually exclusive. For example, one set of computer systems may store the one or more computer programs from which another, different set of computer systems downloads the one or more computer programs and executes the instructions thereof.

Figure 5:
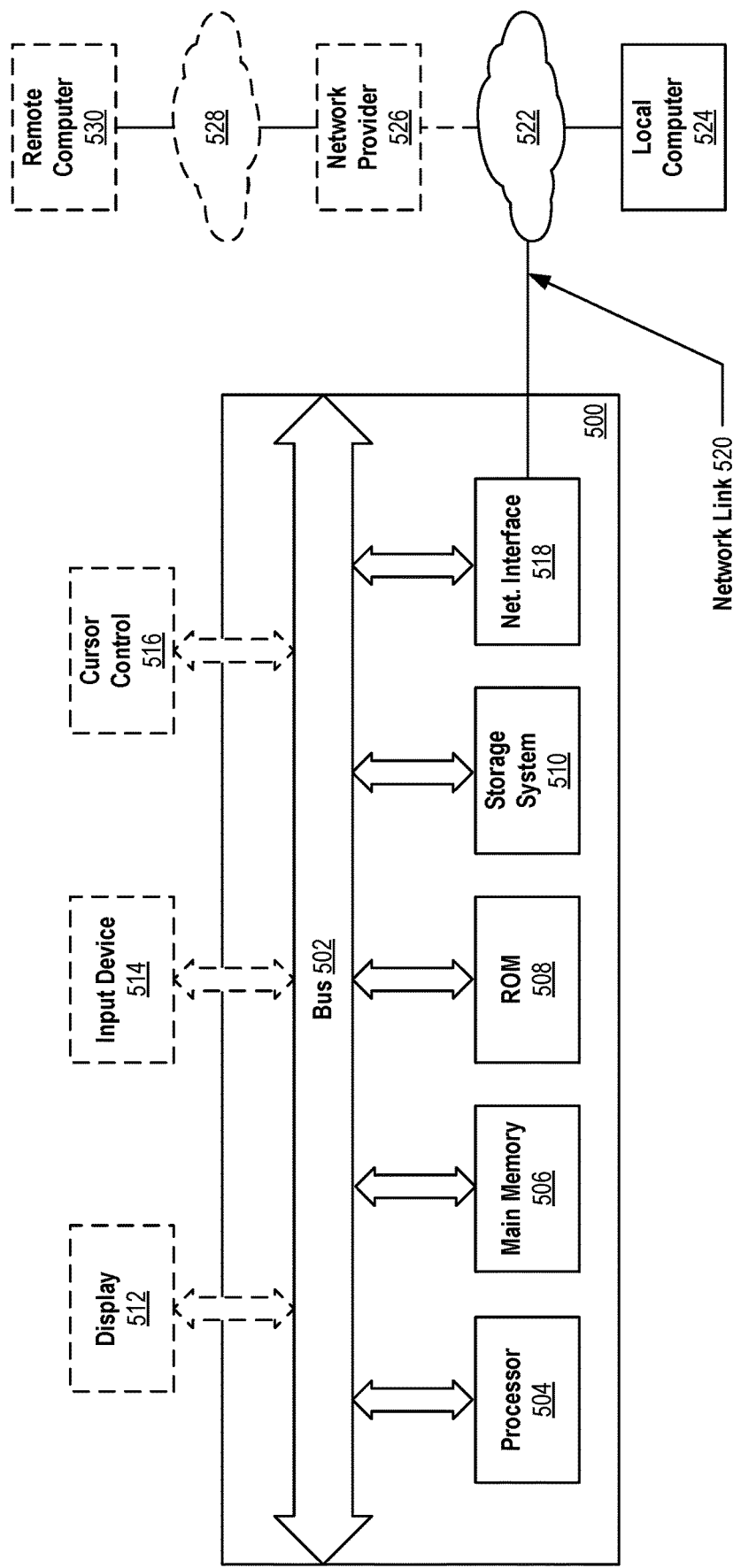
FIG. 5 is a block diagram that illustrates a computer system upon which an embodiment of the invention may be implemented.

FIG. 5 is a block diagram of example computer system 500 used in an implementation of the present invention. Computer system 500 includes bus 502 or other communication mechanism for communicating information, and one or more hardware processors coupled with bus 502 for processing information.

Hardware processor 504 may be, for example, a general-purpose microprocessor, a central processing unit (CPU) or a core thereof, a graphics processing unit (GPU), or a system on a chip (SoC).

Computer system 500 also includes a main memory 506, typically implemented by one or more volatile memory devices, coupled to bus 502 for storing information and instructions to be executed by processor 504. Main memory 506 also may be used for storing temporary variables or other intermediate information during execution of instructions by processor 504.

Computer system 500 may also include read-only memory (ROM) 508 or other static storage device coupled to bus 502 for storing static information and instructions for processor 504.

A storage system 510, typically implemented by one or more non-volatile memory devices, is provided and coupled to bus 502 for storing information and instructions.

Computer system 500 may be coupled via bus 502 to display 512, such as a liquid crystal display (LCD), a light emitting diode (LED) display, or a cathode ray tube (CRT), for displaying information to a computer user. Display 512 may be combined with a touch sensitive surface to form a touch screen display. The touch sensitive surface may be an input device for communicating information including direction information and command selections to processor 504 and for controlling cursor movement on display 512 via touch input directed to the touch sensitive surface such by tactile or haptic contact with the touch sensitive surface by a user's finger, fingers, or hand or by a hand-held stylus or pen. The touch sensitive surface may be implemented using a variety of different touch detection and location technologies including, for example, resistive, capacitive, surface acoustical wave (SAW) or infrared technology.

Input device 514, including alphanumeric and other keys, may be coupled to bus 502 for communicating information and command selections to processor 504.

Another type of user input device may be cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Instructions, when stored in non-transitory storage media accessible to processor 504, such as, for example, main memory 506 or storage system 510, render computer system 500 into a special-purpose machine that is customized to perform the operations specified in the instructions. Alternatively, customized hard-wired logic, one or more ASICs or FPGAs, firmware and/or hardware logic which in combination with the computer system causes or programs computer system 500 to be a special-purpose machine.

A computer-implemented process may be performed by computer system 500 in response to processor 504 executing one or more sequences of one or more instructions contained in main memory 506. Such instructions may be read into main memory 106 from another storage medium, such as storage system 510. Execution of the sequences of instructions contained in main memory 506 causes processor 504 to perform the process. Alternatively, hard-wired circuitry may be used in place of or in combination with software instructions to perform the process.

The term "storage media" as used herein refers to any non-transitory media that store data and/or instructions that cause a machine to operate in a specific fashion. Such storage media may comprise non-volatile media (e.g., storage system 510) and/or volatile media (e.g., main memory 506). Non-volatile media includes, for example, read-only memory (e.g., EEPROM), flash memory (e.g., solid-state drives), magnetic storage devices (e.g., hard disk drives), and optical discs (e.g., CD-ROM). Volatile media includes, for example, random-access memory devices, dynamic random-access memory devices (e.g., DRAM) and static random-access memory devices (e.g., SRAM).

Storage media is distinct from but may be used in conjunction with transmission media. Transmission media participates in transferring information between storage media. For example, transmission media includes coaxial cables, copper wire and fiber optics, including the circuitry that comprise bus 502. Transmission media can also take the form of acoustic or light waves, such as those generated during radio-wave and infra-red data communications.

Computer system 500 also includes a network interface 518 coupled to bus 502. Network interface 518 provides a two-way data communication coupling to a wired or wireless network link 520 that is connected to a local, cellular or mobile network 522. For example, communication interface 518 may be IEEE 802.3 wired "ethernet" card, an IEEE 802.11 wireless local area network (WLAN) card, an IEEE 802.15 wireless personal area network (e.g., Bluetooth) card or a cellular network (e.g., GSM, LTE, etc.) card to provide a data communication connection to a compatible wired or wireless network. In an implementation, communication interface 518 sends and receives electrical, electromagnetic or optical signals that carry digital data streams representing various types of information.

Network link 520 typically provides data communication through one or more networks to other data devices. For example, network link 520 may provide a connection through network 522 to local computer system 524 that is also connected to network 522 or to data communication equipment operated by a network access provider 526 such as, for example, an internet service provider or a cellular network provider. Network access provider 526 in turn provides data communication connectivity to another data communications network 528 (e.g., the internet). Networks 522 and 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the networks 522 and 528, network link 520 and communication interface 518. In the internet example, a remote computer system 530 might transmit a requested code for an application program through network 528, network 522 and communication interface 518. The received code may be executed by processor 504 as it is received, and/or stored in storage device 510, or other non-volatile storage for later execution.

CONCLUSION

In the foregoing detailed description, possible implementations of the present invention have been described with reference to numerous specific details that may vary from implementation to implementation. The detailed description and the figures are, accordingly, to be regarded in an illustrative rather than a restrictive sense.

Reference in the detailed description to an implementation of the present invention is not intended to mean that the implementation is exclusive of other disclosed implementations of the present invention, unless the context clearly indicates otherwise. Thus, a described implementation may be combined with one or more other described implementations in a particular combination, unless the context clearly indicates that the implementations are incompatible. Further, the described implementations are intended to illustrate the present invention by example and are not intended to limit the present invention to the described implementations.

In the foregoing detailed description and in the appended claims, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface, without departing from the scope of the various described implementations. The first user interface and the second user interface are both user interfaces, but they are not the same user interface.

As used in the foregoing detailed description and in the appended claims of the various described implementations, the singular forms "a," "an," and "the" are intended to include the plural forms as well, unless the context clearly indicates otherwise. As used in the foregoing detailed description and in the appended claims, the term "and/or" refers to and encompasses any and all possible combinations of one or more of the associated listed items.

As used in the foregoing detailed description in the appended claims, the terms "based on," "according to," "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

For situations in which implementations discussed above collect information about users, the users may be provided with an opportunity to opt in/out of programs or features that may collect personal information. In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized rather than associated with a particular user. For example, the user preferences or user interactions may be generalized based on user demographics.

The invention claimed is:

1. A method comprising:
computing a first set of vector similarity measurements, wherein each vector similarity measurement of the first set of vector similarity measurements is computed based on a first numerical vector and a vector of a set of second numerical vectors, the first numerical vector representing an input keyword unit, each vector of the set of second numerical vectors representing a set of one or more image content class keyword units;
forming a third numerical vector based on the first set of vector similarity measurements;
computing a second set of vector similarity measurements, wherein each vector similarity measurement of the second set of vector similarity measurements is computed based on the third numerical vector and a vector of a set of fourth numerical vectors, the set of fourth numerical vectors representing a set of digital images; and
selecting a set of one or more digital images of the set of digital images as relevant to the input keyword unit based on a set of one or more vector similarity measurements of the second set of vector similarity measurements.

2. The method of claim 1, further comprising:
mapping the input keyword unit to a word vector;
normalizing the word vector for a unit L2 norm thereby generating a normalized word vector;
performing a common component removal operation based on the normalized word vector thereby generating a corrected word vector; and
normalizing the corrected word vector for a unit L2 norm thereby generating the first numerical vector.

3. The method of claim 1, further comprising:
ranking the set of digital images based on the second set of vector similarity measurements; and
selecting the set of one or more digital images of the set of digital images as relevant to the input keyword unit based on the ranking.

4. The method of claim 1, further comprising:
retrieving the set of fourth numerical vectors from an inverted index based on a set of image content categories to which a set of non-zero elements of the third numerical vector correspond.

5. The method of claim 1, further comprising:
mapping a set of image content class keywords units to a set of word vectors;
normalizing the set of word vectors for a unit L2 norm thereby generating a set of normalized word vectors;
performing a common component removal operation based on the set of normalized word vectors thereby generating a set of corrected word vectors; and
normalizing the set of corrected word vectors for a unit L2 norm thereby generating the set of second numerical vectors.

6. The method of claim 1, further comprising:
translating a set of image content class keyword units in a source language to a set of image content class keywords units in a target language;
mapping the set of image content class keywords units in the target language to a set of word vectors for the target language;
generating the set of second numerical vectors based on the set of word vectors for the target language; and
wherein the input keyword unit is in the target language.

7. The method of claim 1, further comprising:
based on the selecting the set of one or more digital images as relevant to the input keyword unit, causing a graphical user interface to be displayed at a computing device that indicates that the set of one or more digital images is relevant to the input keyword unit.

8. The method of claim 1, further comprising:
based on the selecting the set of one or more digital images as relevant to the input keyword unit, causing the set of one or more digital images to be suggested to a user of a document editing computer application to include in a document being edited.

9. The method of claim 1, further comprising:
generating the set of fourth numerical vectors based on classifying the set of digital images into a set of image content classes, wherein an element of a vector of the set of fourth numerical vectors reflects a probability that a digital image of the set of digital images corresponding to the vector belongs to an image content class of the set of image content classes corresponding to the element.

10. The method of claim 1, wherein:
each vector similarity measurement of the first set of vector similarity measurements is computed as a dot product of the first numerical vector and a vector of a set of second numerical vectors; and
each vector similarity measurement of the second set of vector similarity measurements is computed as a dot product of the third numerical vector and a vector of a set of fourth numerical vectors.

11. The method of claim 1, wherein:
each vector similarity measurement of the first set of vector similarity measurements is computed as a cosine similarity between the first numerical vector and a vector of a set of second numerical vectors; and
each vector similarity measurement of the second set of vector similarity measurements is computed as a cosine similarity between the third numerical vector and a vector of a set of fourth numerical vectors.

12. One or more non-transitory storage media comprising instructions which, when executed by a computing system having one or more processors, cause the computing system to perform:
multiplying a first matrix by a second matrix to generate a third matrix, the first matrix comprising a first set of numerical vectors, the second matrix comprising a second set of numerical vectors, the third matrix comprising a third set of numerical vectors, each vector of the first set of numerical vectors representing a digital image of a set of digital images, each numerical vector of the second set of numerical vectors representing a set of one or more image content class keyword units;
after generating the third matrix, obtaining a first numerical vector representing an input keyword unit;
multiplying the third matrix by the first numerical vector representing the input keyword unit to generate a second numerical vector, the second numerical vector comprising a set of numerical elements, each numerical element of the set of numerical elements being for a digital of the set of digital images; and
selecting a set of one or more digital images of the set of digital images as relevant to the input keyword unit based on the set of numerical elements of the second numerical vector.

13. The non-transitory storage media of claim 12, further comprising instructions which, when executed by the computing system, cause the computing system to perform:

generating the first set of numerical vectors based on classifying the set of digital images into a set of image content classes, wherein an element of a vector of the first set of numerical vectors reflects a probability that a digital image of the set of digital images corresponding to the vector belongs to an image content class of the set of image content classes corresponding to the element.

14. The non-transitory storage media of claim 12, wherein:
the multiplying the first matrix by the second matrix to generate the third matrix is based on computing dot products of the first set of numerical vectors and the second set of numerical vectors; and
the multiplying the third matrix by the first numerical vector to generate the second numerical vector is based on computing dot products of the third set of numerical vectors and the first numerical vector.

15. The non-transitory storage media of claim 12, wherein:
the multiplying the first matrix by the second matrix to generate the third matrix is based on computing cosine similarities between the first set of numerical vectors and the second set of numerical vectors; and
the multiplying the third matrix by the first numerical vector to generate the second numerical vector is based on computing cosine similarities between the third set of numerical vectors and the first numerical vector.

16. A computing system comprising:
one or more processors;
storage media; and
instructions stored in the storage media and which, when executed by the computing system, cause the computing system to perform:
multiplying an image matrix by a category matrix to generate an image-label matrix, the image matrix comprising a first set of numerical vectors, the category matrix comprising a second set of numerical vectors, the image-label matrix comprising a third set of numerical vectors, each vector of the first set of numerical vectors representing a digital image of a set of digital images, each numerical vector of the second set of numerical vectors representing a set of one or more image content class keyword units;
after generating the image-label matrix, obtaining a first numerical vector representing an input keyword unit;
multiplying the image-label matrix by the first numerical vector representing the input keyword unit to generate a second numerical vector, the second numerical vector comprising a set of numerical elements, each numerical element of the set of numerical elements being for a digital image of the set of digital images; and
selecting a set of one or more digital images of the set of digital images as relevant to the input keyword unit based on the set of numerical elements of the second numerical vector.

17. The computing system of claim 16, further comprising instructions which, when executed by the computing system, cause the computing system to perform:
generating the first set of numerical vectors based on classifying the set of digital images into a set of image content classes, wherein an element of a vector of the first set of numerical vectors reflects a probability that a digital image of the set of digital images corresponding to the vector belongs to an image content class of the set of image content classes corresponding to the element.

18. The computing system of claim 16, wherein:
the multiplying the image matrix by the category matrix to generate the image-label matrix is based on computing dot products of the first set of numerical vectors and the second set of numerical vectors; and
the multiplying the image-label matrix by the first numerical vector to generate the second numerical vector is based on computing dot products of the third set of numerical vectors and the first numerical vector.

19. The computing system of claim 16, wherein:
the multiplying the image matrix by the category matrix to generate the image-label matrix is based on computing cosine similarities between the first set of numerical vectors and the second set of numerical vectors; and
the multiplying the image-label matrix by the first numerical vector to generate the second numerical vector is based on computing cosine similarities between the third set of numerical vectors and the first numerical vector.

20. The computing system of claim 16, further comprising instructions which, when executed by the computing system, cause the computing system to perform:
causing at least one digital image, of the set of one or more digital images selected as relevant to the input keyword unit, to be presented in a graphical user interface as a recommendation to insert into a document; and wherein the input keyword unit is a keyword unit of the document.

* * * * *